(12) United States Patent
Blanton

(10) Patent No.: US 7,011,330 B2
(45) Date of Patent: Mar. 14, 2006

(54) AUTOMATIC HITCH ASSEMBLY

(75) Inventor: Jeffrey W. Blanton, Lexington, KY (US)

(73) Assignee: Toyota Motor Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 10/613,280

(22) Filed: Jul. 3, 2003

(65) Prior Publication Data

US 2005/0001407 A1     Jan. 6, 2005

(51) Int. Cl.
*B60D 7/00*     (2006.01)

(52) U.S. Cl. ...................................... 280/510; 280/515

(58) Field of Classification Search ................ 280/508, 280/510, 512, 515
See application file for complete search history.

(56) References Cited

U.S. PATENT DOCUMENTS

| | | | |
|---|---|---|---|
| 752,300 A | 2/1904 | Randolph, Jr. | |
| 774,903 A | 11/1904 | Ammann | |
| 788,692 A | 5/1905 | Ammann | |
| 827,431 A * | 7/1906 | Evensen | 280/477 |
| 1,465,168 A | 8/1923 | Morris | |
| 1,874,147 A * | 8/1932 | Williams | 280/498 |
| 1,971,340 A | 8/1934 | Foulk | |
| 2,221,492 A | 11/1940 | Sawyer | |
| 2,636,744 A | 4/1953 | Trees | |
| 2,766,995 A | 10/1956 | Weiss | |
| 2,951,711 A | 9/1960 | Karnath et al. | |
| 3,891,237 A | 6/1975 | Allen | |
| 4,225,149 A * | 9/1980 | Koopman | 280/477 |
| 4,463,965 A | 8/1984 | Lawson | |
| 5,244,047 A | 9/1993 | Eudy | |

* cited by examiner

*Primary Examiner*—Lesley D. Morris
*Assistant Examiner*—Matthew Luby
(74) *Attorney, Agent, or Firm*—Dinsmore & Shohl LLP

(57) ABSTRACT

An automatic hitch may include a base, a support surface, a jaw assembly connected to the base and having engaged and disengaged positions and a biasing member associated with the jaw assembly. The biasing member may be configured to normally bias the jaw assembly toward the support surface. The automatic hitch may also include a release mechanism configured to apply upward force to the jaw assembly upon downward actuation of the release mechanism to move the jaw assembly into the disengaged position.

15 Claims, 3 Drawing Sheets

AUTOMATIC HITCH ASSEMBLY

FIELD OF THE INVENTION

This invention relates to a hitch for joining a trailer to a vehicle. More particularly, this invention relates to an ergonomically improved easy to operate hitch assembly having an automatic top action jaw.

BACKGROUND OF THE INVENTION

A variety of hitch assemblies for securing trailers to vehicles are known. One such assembly includes a bottom action jaw design having a spring-loaded arm configured to grasp a bail or tongue of a trailer from the bottom.

Issues arise with such bottom action jaws when the spring loses its resilience and/or when the device is subjected to sudden jars such as are common from bumps along the path of travel. For example, because the spring biases the arm upward, loss of spring resiliency or bounce from a bump may cause the arm to drop out of the jaw thereby allowing disengagement of the tongue and a connected trailer(s). Such occurrences can lead to undesirable and potentially harmful situations.

Another issue arises with such hitch assemblies in that they can be difficult to disengage from an engaged tongue. Often, the release mechanism must be forced upward or sideways to release the jaw from the tongue, and therefore, does not allow an operator to ergonomically or advantageously use his/her body weight to disengage the hitch from the tongue.

As such, there is a desire for an automatic hitch assembly having an improved jaw design and a release mechanism configured to facilitate easy release of the hitch from the trailer tongue.

SUMMARY OF THE INVENTION

Accordingly, the present invention is intended to address and obviate problems and shortcomings and otherwise improve previous hitch assemblies.

To achieve the foregoing and other objects and in accordance with the exemplary embodiments of the present invention, an automatic hitch may comprise a base, a support surface, a jaw assembly connected to the base and having engaged and disengaged positions, and a biasing member associated with the jaw assembly. The biasing member may be configured to normally bias the jaw assembly toward the support surface in its engaged position. The automatic hitch may also comprise a release mechanism configured to apply upward force to the jaw assembly upon downward actuation of the release mechanism to move the jaw assembly into the disengaged position.

To further achieve the foregoing and other objects and in accordance with the exemplary embodiments of the present invention, a method for releasing a tongue from a hitch comprises the steps of providing a hitch assembly having a top action jaw assembly in association with a release mechanism, applying downward force on one end of the release mechanism, creating an upward force on opposite end of the release mechanism, and applying the upward force to the jaw assembly to move the jaw assembly to a disengaged position.

Still other embodiments, combinations, advantages and objects of the present invention will become apparent to those skilled in the art from the following descriptions wherein there are shown and described alternative exemplary embodiments of this invention for illustration purposes. As will be realized, the invention is capable of other different aspects, objects and embodiments all without departing from the scope of the invention. Accordingly, the drawings, objects, and description should be regarded as illustrative and exemplary in nature only and not as restrictive.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
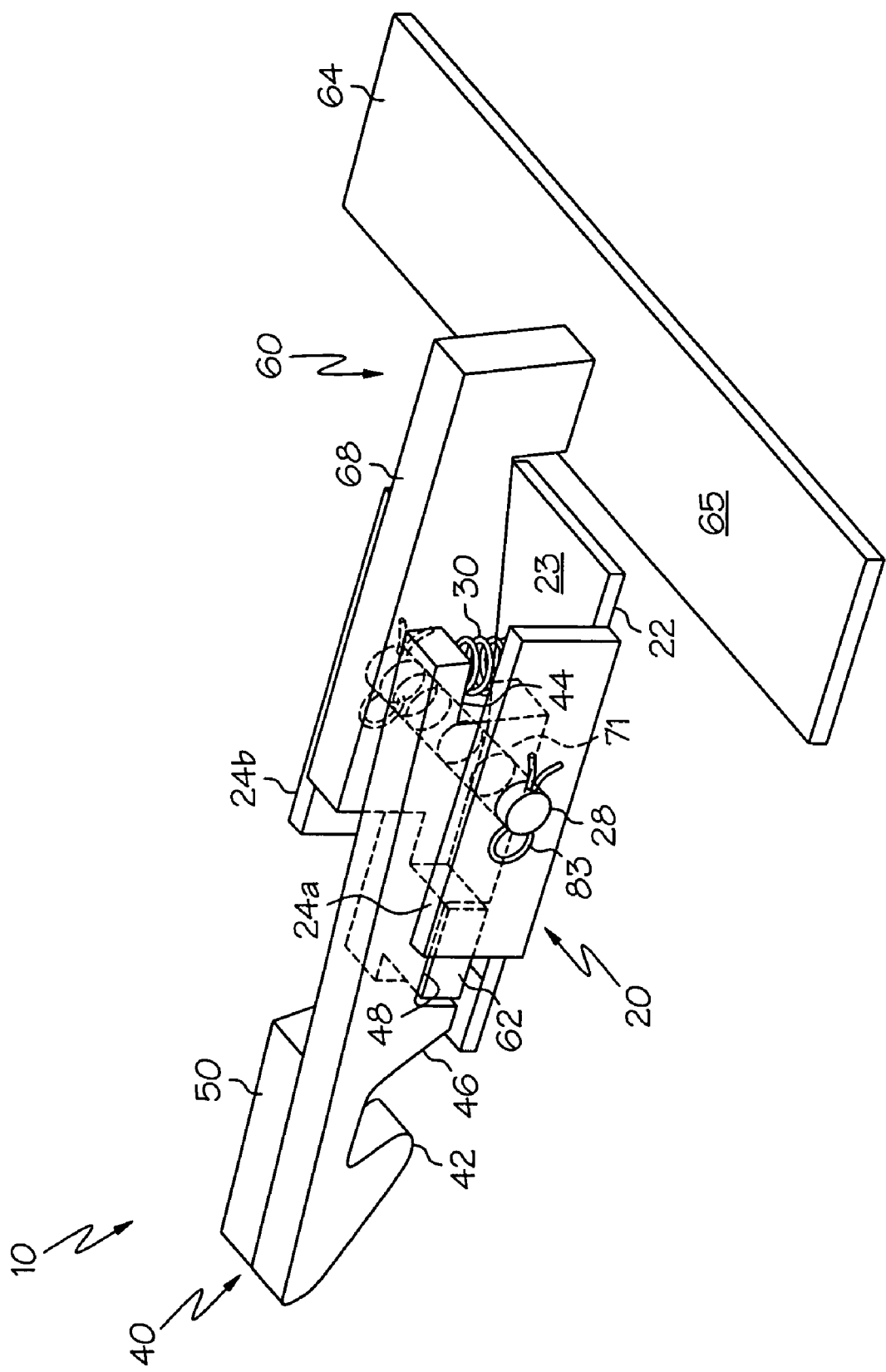
FIG. 1 is a perspective view of an exemplary automatic hitch assembly in accordance with the present invention.

Referring to the drawing figures in detail, wherein like numerals indicate the same elements throughout the drawing figures, FIG. 1 illustrates an exemplary automatic hitch assembly 10 as generally having a base 20, a jaw assembly 40 and a release mechanism 60. Hitch assembly 10 and components thereof may be comprised of metal, plastic and/or any combination of durable materials.

Figure 2:
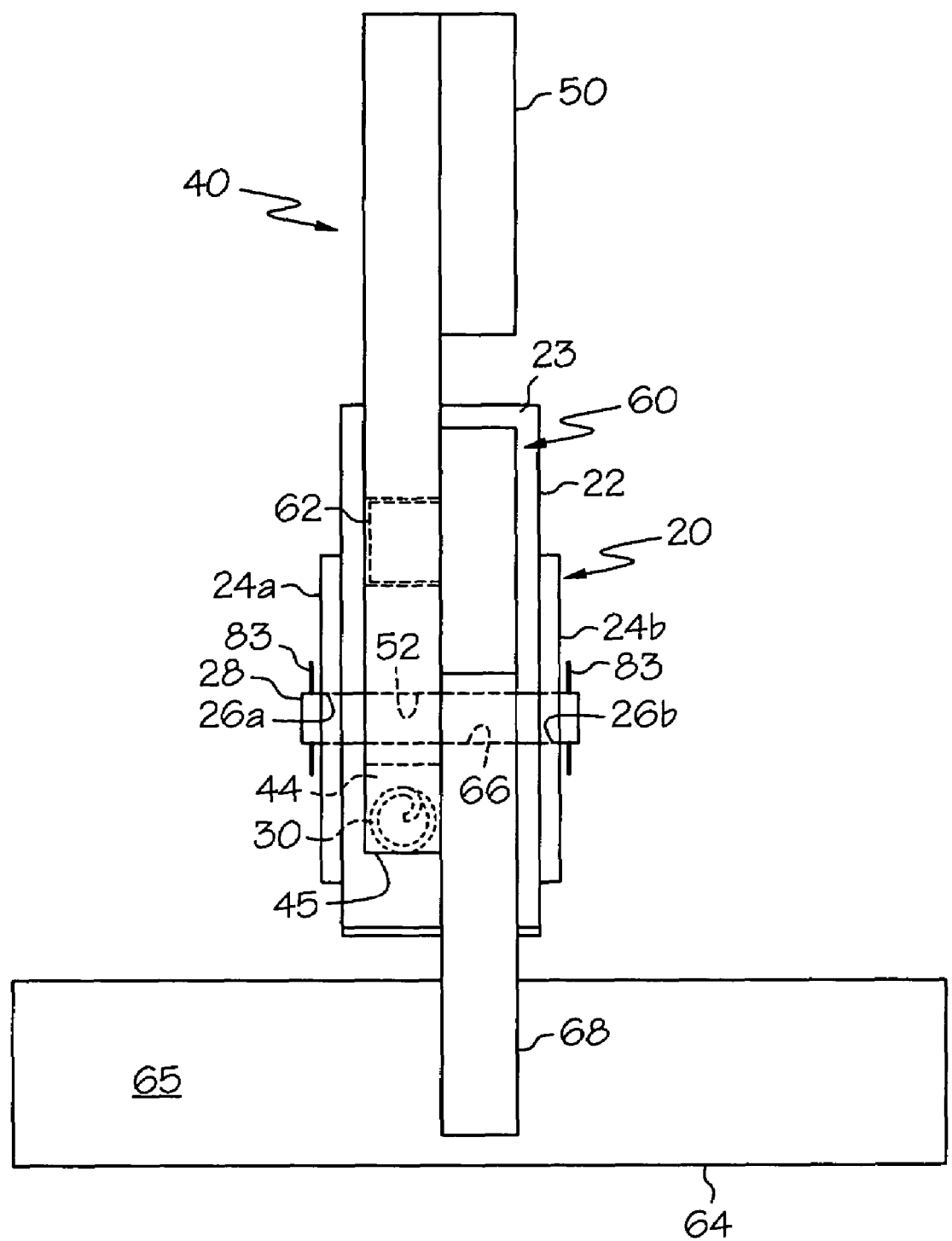
FIG. 2 is a top view of an automatic hitch assembly including a base, a jaw assembly and a release mechanism in accordance with the present invention.
Figure 3:
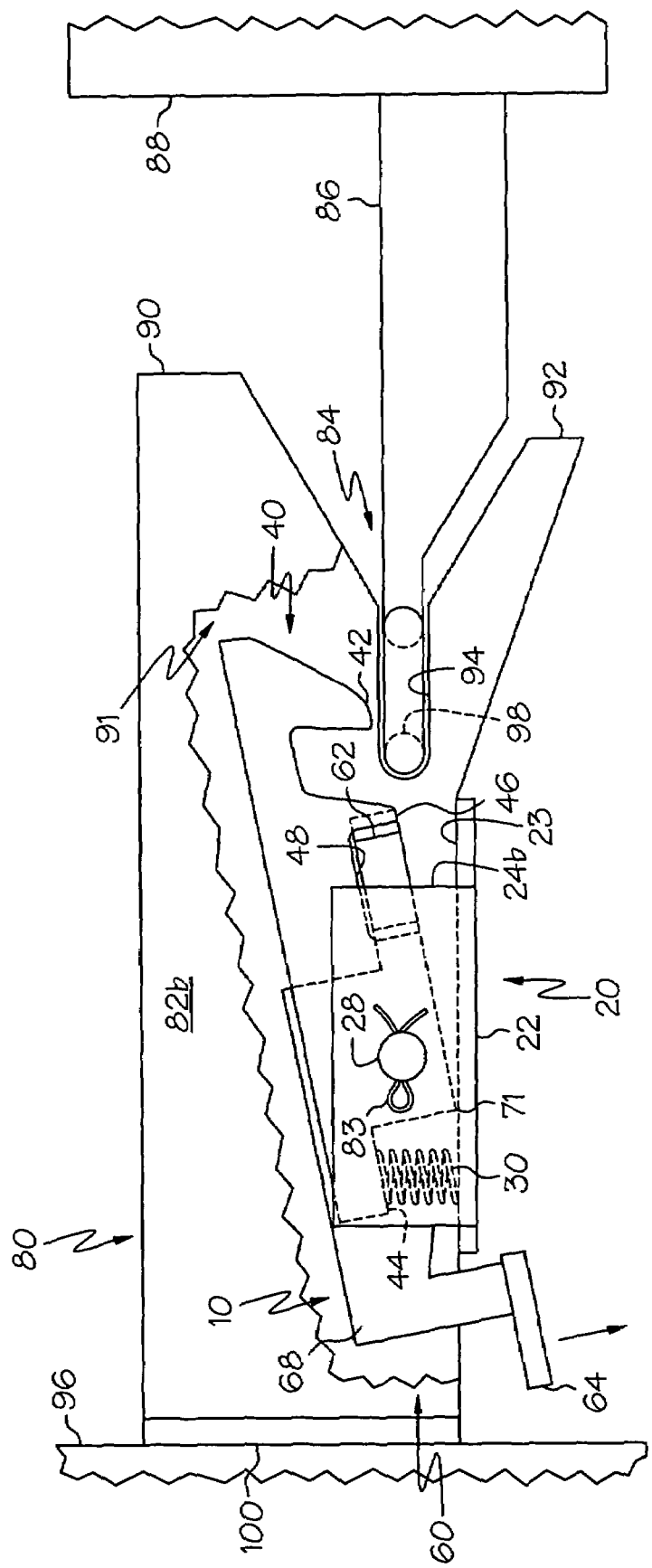
FIG. 3 is a partially broken-out side elevation view of an exemplary automatic hitch assembly in use and illustrating a casing and the jaw assembly in a disengaged position.

As illustrated in FIGS. 1–3, base 20 may comprise a lower plate 22 with two walls 24a and 24b extending upwardly at about a 90° angle therefrom. Lower plate 22 may comprise any length and/or width and include a support surface 23. Support surface 23 may function as a lowermost support or "stop" for jaw assembly 40 adjacent to stopping member 46 when in an engaged position (as illustrated in FIG. 1). In another embodiment, lower surface 22 and support surface 23 may extend to or beyond hook 42 of jaw assembly 40 thereby providing a similar support or "stop" surface for hook 42 and/or a tongue of a trailer to rest upon, as will be further discussed below.

Walls 24a and 24b may include base mounting apertures 26a and 26b (FIG. 2). As discussed later herein, jaw assembly 40 and release mechanism 60 may be secured to base 20 by, for example, inserting an attachment device (e.g. pin 28 in FIG. 1) through jaw assembly 40, release mechanism 60 and base mounting apertures 26a and 26b. If desired, cotter pins (e.g. cotter pins 83) or other retaining arrangement(s) may be used to prevent pin 28 from becoming disengaged or falling out.

The base 20 may also comprise a biasing member 30 such as a spring or other appropriate biasing arrangement mounted to or otherwise supported by the base 20 and extending upwardly therefrom. As discussed further below, biasing member 30 can function to normally bias hook 42 of jaw assembly 40 downward into an engaged position. As illustrated in FIGS. 1 and 2, biasing member 30 may comprise a spring of any size and resiliency necessary to bias hook 42 of jaw assembly in an engaged position. Also, it should be understood that biasing member 30 may comprise any mechanism configured to bias jaw assembly 40 downward and into an engaged position.

Jaw assembly 40 is illustrated as comprising a hook 42 adjacent to one end of the jaw assembly 40 and a biasing platform 44 adjacent its opposite end. In this example, hook 42 is configured to be a weighted cantilevered arrangement to create a "weighted" bias toward normally engaged position. Hook 42 functions in this embodiment to secure a tongue of a trailer to the hitch assembly 10. For example, the trailer tongue might comprise a rounded portion or ring configured to interact with and be retained within hook. In another embodiment, jaw assembly 40 may be configured to be inserted into a square or rectangular hitch associated with the trailer or any other appropriate embodiment as described below.

As such, hook 42 is configured to provide downward latching of the trailer tongue. The downward latching may be beneficial to prevent the tongue from disengaging the hitch. For example, because the springs in upward latching hitches lose resiliency due to gravity and fatigue, the arms of upward latching hitches may give way and release the trailer. In addition, because of gravity increased "g" forces in use, the springs in upward latching hitches may bounce between engaged and disengaged positions as the vehicle and trailer travels over bumps, creating a potential that such hitches may disengage the attached trailers. The downward latch of the present invention minimizes these problems by utilizing gravity to provide a constant enhancement of the downward bias of the jaw assembly.

Biasing platform 44 of jaw assembly 40 may be associated with biasing member 30 of base 20. Accordingly, the biasing member 30 tends to exert an upward force against biasing platform 44 thereby biasing hook 42 of jaw assembly 40 downward into a normally engaged position. If desired, a counterbalance or counterweight 50 may be mounted adjacent to the outermost end of the jaw assembly (e.g. adjacent hook 42) to augment or further create a downward force of jaw assembly 40 to normally maintain it in engaged position relative to support surface 23.

Counterweight 50 may be any weight necessary to assist in biasing jaw assembly 40 into an engaged position. In addition, counterweight can be "tuned" to the size of the device, the application environment, and downward latching pressure/forces desired. Because the biasing member 30 and counterweight 50 normally bias the hook 42 of jaw assembly 40 downwardly, the hitch is considered herein to be "automatic," as it will automatically receive and latch a trailer tongue when inserted. More particularly, the engagement force (e.g. combination of the counterweight, lever length, spring bias, etc.) allows the jaw assembly to automatically move into an engaged position as a tongue is forcibly inserted or upon release of the release mechanism. As illustrated in FIG. 2, jaw assembly 40 may further comprise a jaw aperture 52 or through-bore to accommodate an attachment arrangement such as pivot pin 28 (FIG. 1) which may be inserted therein, and whereby jaw assembly 40 may be operatively mounted to base 20. In another embodiment, jaw assembly 40 could also be mounted via any other pivot, lever or bearing arrangement such that jaw assembly 40 is pivotally mounted relative to base 20.

As illustrated in FIG. 1, jaw assembly 40 may also comprise a stopping member 46 configured to limit downward rotation of jaw assembly 40 when the jaw assembly 40 is in an engaged position, and to ensure proper alignment and engagement of the assembly hook 42 with a latch (e.g. 98 in FIG. 3) of a trailer tongue in engaged position. More particularly, stopping member 46 may butt against support surface 23 of base 20 in engaged position so that jaw assembly 40 may not rotate to a point below base 20. In another embodiment, hook 42 may itself function as both a stopping member and the hook for locking the trailer latch in place. Jaw assembly 40 may also comprise a cutout 48, notch, or other receptor configured to non-interferingly receive disengaging arm 62 of release mechanism 60. As described further below, arm 62 of release mechanism 60 may be configured to selectively facilitate the application of upward force to jaw assembly 40 (via cutout 48) in order to move jaw assembly 40 into a disengaged position.

As illustrated in FIGS. 1 and 3, release mechanism 60 might comprise a lever 68 having an arm 62 adjacent one end and an actuation device such as step 64 adjacent an opposite end. Lower portion 71 of lever 68 may be removed, relieved or cut out to prevent interference with lower plate 22. As illustrated in FIG. 2, release mechanism 60 may further comprise release mechanism aperture 66 for accommodating a connection such as pin 28 (see FIG. 1) in order to mount release mechanism to base 20 in a movable manner.

Actuation element or step 64 secured to lever 68 may comprise a generally flat surface 65 and may be configured to support or otherwise convey any amount of force necessary to move jaw assembly 40 into a disengaged position. In addition, while the present invention is described herein as using mechanical force to move the jaw assembly 40 into a disengaged position, it is contemplated that the force necessary to move jaw assembly may be supplied and/or augmented hydraulically and/or pneumatically (not shown in the illustrated examples). For example, a pneumatic cylinder might be located between base 20 and jaw assembly 40, and actuated by threshold force of activation on release mechanism 60.

As illustrated in FIG. 1, and as previously discussed above, jaw assembly 40 and release mechanism 60 may be pivotally mounted to base 20 such as by common connection via pin 28. In an engaged position relative to the base in the embodiment of FIG. 1, biasing member 30 pushes against biasing platform 44 of jaw assembly thereby tending to move jaw assembly about pin 28 and forcing hook 42 and stopping mechanism 46 of jaw assembly 40 downwardly. Jaw assembly 40 is prevented from rotating past a desired point (e.g. below base 20) when stop assembly 46 comes into contact with support surface 23 of base 20. In another embodiment, any part of jaw assembly may be used to rest against support surface of base 20 or any other surface to limit rotation of jaw assembly as appropriate. If desired, a lock or other apparatus may be used to secure jaw assembly in an engaged position or to prevent actuation of the release assembly thereby further ensuring uninterrupted attachment of the trailer or load.

In order to move jaw assembly 40 into a disengaged position (e.g. FIG. 3), force may be applied through release mechanism 60, such as via step 64. Such force may be created, for example, by an operator applying force with his/her foot. In another embodiment, the operator may apply force directly to the outward end of the release mechanism 60 (e.g. lever 68), thereby eliminating the need for a step or other release arrangement. In addition, it is contemplated by the present invention that step 64 can be associated with release mechanism 60 in a variety of embodiments, positions, shapes and configurations.

The downward force on the release mechanism 60 pivots release mechanism 60 about pin 28 thereby creating an upward force at the opposite end of release mechanism (e.g. arm 62). The arm 62 thereby contacts cutout 48 of jaw assembly 40 tending to force jaw assembly 40 to similarly rotate about pin 28, thereby moving jaw assembly 40 to a disengaged position (as exemplified in FIG. 3). In another embodiment, jaw assembly 40 and release mechanism 60 may have independent pivot points/pins.

Accordingly, the present invention allows ergonomic operation of the hitch assembly (e.g. use legs vs. hands or arms). The ergonomic operation can be beneficial to allow operators of all statures and physical conditions to easily latch and unlatch trailers to vehicles because downward force (e.g. body weight) applied to a proper location of the hitch assembly results is upward movement of hook 42 of jaw assembly 40 to disengage a trailer. In addition, because the release mechanism of the hitch assembly is configured to provide placement of a foot for release operations, an operator need not take his/her eyes off of other tasks in order to focus on the release mechanism. Rather, the operator need simply place a foot on the release mechanism and apply force.

It is, of course, contemplated that the present invention may be accomplished in a variety of different embodiments. For example, while it is believed less effort is needed to move the biased (and weighted) jaw assembly into a disengaged position with the incorporation of a release mechanism associated adjacent the hook of the jaw assembly and configured to provide upward force thereon, the invention may similarly be accomplished by simply exerting a downward force on one end of the jaw assembly itself (e.g. the outermost end 45 of the jaw assembly effectively becomes the release mechanism). In addition, any variety of latches, release mechanisms and bases may be used to accomplish an automatic hitch assembly having a jaw assembly configured to be moved upwardly into a disengaged position upon exertion of downward force onto a release assembly.

Referring again to FIG. 3, an exemplary hitch assembly 10 is illustrated as being enclosed or housed within a casing 80. Casing 80 may be comprised of steel components welded together to form a unitary structure. In another embodiment, casing 80 may be comprised of any durable parts to enclose hitch assembly 10 and provide a resting surface 94 therefore. In addition, casing 80 may be configured at any size to sufficiently cover at least the moving parts of hitch assembly 10. Casing 80 may be secured to base 20, for example, by inserting casing walls (82b shown) between base walls (see 24a and 24b in FIG. 2) and inserting pin 28 through base walls, casing walls, release mechanism 60 and jaw assembly 40. As mentioned above, if desired, cotter pins 83 may be inserted through pin 28 to prevent pin from slipping out of component apertures.

As illustrated in FIG. 3, casing 80 may comprise a generally Y-shaped opening 84 and be configured for guiding and easy insertion of a latch 98 of tongue 86 from trailer 88. Upper end 90 of opening 84 may comprise a compartment 91 configured to allow hitch assembly 10 to move therein without interference. Lower end of opening 84 might also comprise a lip 92 having a resting surface 94. Resting surface 94 may be configured to receive and align hook 42 of jaw assembly 40 when jaw assembly 40 is in an engaged position. In one embodiment, resting surface 94 may function as a support surface similar to support surface 23 of base 20 and may be configured to serve as a stop to receive hook 42 and/or stopping member 46. In another embodiment where support surface 23 of base 20 extends below hook 42, resting surface 94 (and lip 92) may not be needed.

Casing 80 may also be used to mount hitch assembly 10 and its components to a vehicle (e.g. illustrated as 96 in FIG. 3). Casing 80 may be mounted to vehicle 96 by, for example, a weld 100 or any other appropriate fastening arrangement, and can be configured to provide attachment of hitch assembly to a trailer. In such an arrangement, as discussed above, opening 84 would be located to receive a latch (e.g. 98) of a tongue 86 of a trailer (e.g. 88) or other vehicle to be towed. In another embodiment, casing 80 and hitch assembly 10 may be mounted directly to a trailer (e.g. 88) and tongue 86 may extend from a vehicle 96.

Also, while it is contemplated that the embodiment of the hitch assembly described above may be used with noncommercial vehicles (e.g. manufacturing facility carts/daisy chained trailers, etc.), it should be understood that such hitch assemblies may be used to secure any number and type of vehicles to one another.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. For example, the automatic hitch assembly in accordance with the present invention may comprise jaw assemblies and other components of varying sizes and shapes in a variety of different arrangements. Accordingly, while some of the alternative embodiments of the automatic hitch assembly has been discussed specifically, other embodiments will be apparent or relatively easily developed by those of ordinary skill in the art. Accordingly, this invention is intended to embrace all alternatives, modifications and variations that have been discussed herein, and others that fall within the spirit and broad scope of the claims.

What is claimed is:

1. An automatic hitch comprising:
   (a) a base;
   (b) a support surface;
   (c) a jaw assembly connected to said base, said jaw assembly including a receptor and having engaged and disengaged positions;
   (d) a biasing member associated with said jaw assembly, said biasing member configured to normally bias said jaw assembly downwardly toward said support surface; and
   (e) a release mechanism configured to pivot relative to said base and the jaw assembly, the release mechanism having an arm associated with said receptor, said arm configured to engage said receptor and apply upward force to said jaw assembly upon downward actuation of said release mechanism to move said jaw assembly into said disengaged position.

2. The automatic hitch as in claim 1, further comprising a casing configured to house said base.

3. The automatic hitch as in claim 1, wherein said jaw assembly comprises a counterbalance.

4. The automatic hitch as in claim 3, wherein said counterbalance is configured to augment said biasing member.

5. The automatic hitch as in claim 1, wherein said jaw assembly comprises a hook at one end.

6. The automatic hitch as in claim 1, wherein said jaw assembly is pivotally connected to said base.

7. The automatic hitch as in claim 1, wherein said release mechanism comprises an actuation step.

8. The automatic hitch as in claim 1, wherein said release mechanism is pivotally connected to said base.

9. The automatic hitch as in claim 1, wherein said biasing member comprises a spring.

10. An automatic hitch comprising:
    (a) a base having a support surface;

(b) a jaw assembly pivotally connected to said base, said jaw assembly including a receptor and having engaged and disengaged positions;
(c) a biasing member associated with said jaw assembly, said biasing member configured to normally bias said jaw assembly toward said support surface;
(d) a release mechanism configured to pivot relative to said base and the jaw assembly, the release mechanism having an arm associated with said receptor, said arm configured to engage said receptor and apply upward force to said jaw assembly upon downward actuation of said release mechanism to move said jaw assembly into said disengaged position; and
(e) a foot step configured to be controlled by a foot and to cause said downward actuation of said release mechanism.

11. The automatic hitch as in claim 10, wherein said jaw assembly comprises a counterbalance configured to augment said biasing member.

12. The automatic hitch as in claim 10, wherein said release mechanism comprises an actuation step.

13. The automatic hitch as in claim 10, wherein said release mechanism is pivotally connected to said base.

14. The automatic hitch as in claim 10, wherein said biasing member comprises a spring.

15. An automatic hitch comprising:
(a) a base having a support surface;
(b) a jaw assembly configured to engage a trailer hitch and configured to pivot relative to said base, said jaw assembly including a receptor and having engaged and disengaged positions;
(c) a biasing member associated with said jaw assembly, said biasing member configured to normally bias said jaw assembly toward said support surface; and
(d) a foot step having an arm associated with said receptor, said arm configured to pivot relative to said base and the jaw assembly, and to engage said receptor and to cause upward movement of said jaw assembly upon downward actuation of said foot step.

* * * * *